United States Patent Office 2,972,644
Patented Feb. 21, 1961

---

2,972,644

DEHYDROGENATION OR DEHYDROCYCLIZATION OF NON-AROMATIC HYDROCARBONS

Peter Desmond Holmes, John Charles Stalley, and John Arthur Edgar Moy, Sunbury-on-Thames, England, assignors to British Petroleum Company Limited, London, England, a British corporation No Drawing. Filed Nov. 4, 1957, Ser. No. 694,106

Claims priority, application Great Britain Nov. 14, 1956

2 Claims. (Cl. 260—673.5)

This invention relates to the dehydrogenation or dehydrocyclization of non-aromatic hydrocarbons having at least five carbons in the molecule.

The invention is particularly applicable to the production of aromatics from a variety of feedstocks consisting of or containing normal paraffins. Thus, it may be applied, for example, to specific normal paraffins such as n-hexane and n-heptane or mixtures thereof. It may also be applied to hydrocarbon mixtures containing normal paraffins, such as primary flash distillate and the products of the well-known reforming process in which a naphtha fraction is contacted at elevated temperature and pressure and in the presence of hydrogen with a dehydrogenation catalyst, for example a catalyst consisting essentially of platinum and alumina with or without combined halogen, to produce a gasoline fraction of increased octane number.

According to the invention, a process for the dehydrogenation or dehydrocyclization of non-aromatic hydrocarbons having at least five carbon atoms in the molecule, comprises contacting the hydrocarbons with a catalyst consisting of a minor quantity of platinum deposited on or incorporated with a support consisting essentially of alumina and/or silica, at a temperature of 300–600° C. and a pressure not exceeding 50 p.s.i.g., there being no addition of hydrogen whether extraneous or recycled to the reaction zone.

The catalyst is preferably halogen-free since the hydrocracking and isomerizing activity of the catalyst is thereby reduced. These activities are considered to be desirable reactions in the normal type of platinum reforming which up-grades naphthas for high octane gasolines. However, where the aim is aromatic production, as in this invention, these activities are less desirable.

According to a further feature of the invention, the hydrocracking and isomerizing activity of the catalyst may be still further reduced by using a catalyst containing an alkali metal or an alkaline earth metal in combined form. For the purposes of the present specification, magnesium shall be taken to be an alkaline earth metal. The amount of alkali or alkaline earth metal preferably lies within the range 0.01% to 5% wt., a greater amount being required to give a similar activity for aromatic production if the catalyst contains halogen. If the catalyst is halogen-free, the content of alkali or alkaline earth metal should not generally exceed 3% wt. but if the catalyst contains halogen, amounts of alkali or alkaline earth metal up to 5% wt. may be required. Particularly advantageous results are obtained with the alkali metals, especially sodium.

The quantity of platinum preferably lies within the range 0.01% to 5% wt.

The present process besides yielding a normally liquid product having an appreciable content of aromatics and some olefins, also produces appreciable quantities of a hydrogen-rich gas, which is available as a valuable by-product. The term "a pressure up to 50 p.s.i.g." includes atmospheric pressure or below, atmospheric pressure being, in fact, preferred. A temperature in the range 400–600° C. is preferred and the space velocity may be from 0.1 to 1.0 v./v./hr. of liquid feedstock.

The invention also comprises a catalyst for the dehydrogenation or dehydrocyclization of non-aromatic hydrocarbons having at least five carbon atoms in the molecule, consisting of a minor quantity of platinum, deposited on or incorporated with a support consisting essentially of alumina and/or silica, and at least 0.01% wt. of an alkali metal in combined form. The catalyst may also contain a proportion of combined halogen but in such case the catalyst should contain a greater amount of the alkali metal to give to the catalyst a similar activity for aromatic production.

The invention also comprises a halogen-free catalyst for the dehydrogenation or dehydrocyclization of non-aromatic hydrocarbons having at least five carbon atoms in the molecule, consisting of a minor proportion of platinum deposited on a support consisting essentially of alumina and/or silica, and at least 0.01% wt. of an alkali or alkaline earth metal in combined form. The quantity of alkali or alkaline earth metal, the relationship between alkali or alkaline earth metal and halogen, and the quantity of platinum on the catalyst should preferably be as described above.

The catalyst according to the invention may conveniently be produced by heating a material consisting of platinum supported on alumina or silica, preferably at 150° to 600° C. and more particularly at 550° C., cooling, contacting the cooled material with a solution of a water-soluble compound of an alkali or alkaline earth metal in an aqueous medium, if necessary removing excess solution, drying the impregnated solid at, for example, a temperature above 30° C. and below the roasting temperature, and roasting the dried material at 200° to 600° C.

Suitable water-soluble compounds include fatty acid salts and mineral acid salts. A preferred compound is sodium acetate.

The invention will now be described with reference to the following examples.

EXAMPLE 1

77 millilitres of a platinum-on-alumina catalyst in the form of pellets $\frac{1}{16}''$ in diameter and $\frac{1}{16}''$ in length and having the following composition:

| | Percent wt. |
|---|---|
| Platinum | 0.575 |
| Chlorine | 0.90 |
| Sodium | 0.004 | were roasted in air at 550° C. for 1 hour.

5 grams of sodium acetate were dissolved in 60 millilitres of distilled water and the solution added to the catalyst. After standing for 10 minutes, the solution was heated at 100° C. for 15 minutes. Excess solution was decanted and the treated material dried at 160° C. for ½ hour and thereafter roasted at 500° to 550° C. for 2 hours. The material thus obtained had a platinum content of 0.57% wt. and a sodium content of 0.84% wt. of total catalyst.

EXAMPLE 2

Commercial normal hexane was passed at atmospheric pressure over the catalyst prepared as described in Example 1, in the vapour phase in the absence of a carrier gas. By way of comparison, commercial normal hexane was also passed at atmospheric pressure in the vapour phase over the catalyst to which no sodium had been added. The reaction conditions and the results obtained are set out in the following Table 1.

*Table 1*

|  | Feedstock | Catalyst Conditions | | | |
|---|---|---|---|---|---|
|  |  | Run 1 No Sodium added | Run 2 Sodium added | Run 3 Regenerated on Run 2 | Run 4 Regenerated on Run 3 |
| Catalyst temp., °C |  | 475 | 475 | 478 | 497 |
| Space velocity, v./v./hr |  | 0.24 | 0.24 | 0.24 | 0.26 |
| Liquid Recovery, wt. percent | 100 | 56.7 | 84.4 | 82.7 | 73.5 |
| Yield of Products (on feed): |  |  |  |  |  |
| Lower hydrocarbons wt. percent |  | 12.5 | 2.4 |  | 1.3 |
| 2-Methylpentane[1] do | 6.0 | } 4.4 | 4.5 | 4.6 | 4.1 |
| 3-Methylpentane[1] do | 8.5 |  |  |  |  |
| n-Hexane do | 65.4 | 7.1 | 44.0 | 38.7 | 27.2 |
| Methylcyclopentane do | 16.1 | 1.2 | 10.8 | 14.1 | 7.2 |
| Cyclohexane do | 4.0 |  |  |  |  |
| Benzene do |  | 16.9 | 15.4 | 19.3 | 24.9 |
| Toluene do |  | 4.3 | <0.3 | <0.3 | <0.3 |
| Xylenes do |  | 8.3 | <0.3 |  |  |
| $C_9$ Aromatics do |  | 2.0 |  |  |  |

[1] Including hexenes.

Regeneration of the catalyst was carried out by passing a slow stream of air over the heated catalyst for approximately 2 hours at a rate to maintain the reaction temperature below 500° C.

The results set out in Table 1 indicate that, at the said temperature, the production of higher aromatics is materially suppressed when using the sodium-containing catalyst, and although the yield of benzene is slightly less, further quantities of benzene may be produced by recycling a normal hexane fraction to the reaction zone. Run No. 4 indicates that higher temperatures may be used when using the sodium-containing catalyst, resulting in increased production of benzene without producing the same degree of breakdown as occurs at lower temperatures with the catalyst to which sodium has not been added.

Further experiments were carried out in a micro-catalytic reactor (600 mg. catalyst samples) employing a nitrogen carrier gas into which hydrocarbon samples of ca. 2 mg. were injected. The reaction products were analyzed by gas chromatography.

EXAMPLE 3

Experiments were carried out in a micro-catalytic reactor as described above using pure n-hexane at a pressure of ca. 20 p.s.i. ga. The results set out in Table 2 below illustrate the effect of various alkali metals in platinum-on-alumina catalysts, the catalysts being prepared in a manner similar to that described in Example 1.

*Table 2*

| Metal Ion | Max. Yield of Benzene | Max. Yield of Hexane Isomers |
|---|---|---|
| Nil | 21% wt. at 440° C | 15% wt. at 410° C. |
| Sodium | 57% wt. at 500° C | 5% wt. at 450° C. |
| Potassium | 40% wt. at 500° C | 3% wt. at 470° C. |
| Lithium | 31% wt. at 490° C | 5% wt. at 440° C. |
| Calcium | 51% wt. at 520° C | 3% wt. at 460° C. |
| Magnesium | 42% wt. at 520° C | 5% wt. at 440° C. |

The following results show the effect of sodium in a platinum-on-alumina catalyst containing fluorine.

*Table 3*

| Catalyst | Max. Yield of Benzene | Max. Yield of Hexane Isomers |
|---|---|---|
| Without sodium addition | 18% wt. at 430° C | 25% wt. at 360° C. |
| With sodium addition | 53% wt. at 510° C | 2% wt. at 420° C. |
| With sodium addition to a catalyst containing no F | 57% wt. at 500° C | 5% wt. at 450° C. |

EXAMPLE 4

Using the micro-catalytic reactor technique described above and a sodium-promoted platinum-alumina catalyst prepared as described in Example 1, a series of runs were carried out to determine the relative suitability of different paraffin feedstocks. The pressure used in all cases was 20 p.s.i.g.

The feedstocks used, the maximum yield of benzene and the temperature at which the maximum yield was obtained are set out in Table 4 below:

*Table 4*

| Feedstock | Max. yield of benzene |
|---|---|
| n-hexane | 57% wt. at 500° C. |
| 2-methyl pentane | 28% wt. at 575° C. |
| 3-methyl pentane | 52% wt. at 570° C. |
| 2:3-dimethyl butane | 23% wt. at 575° C. |
| 2:2-dimethyl butane | 12% wt. at 590° C. |
| cyclohexane | >90% wt. at 340° C. |
| methyl cyclopentane | 39% wt. at 575° C. |
| 2:5 dimethyl hexane | at least 40% wt. at 470° C. of $C_8$ aromatics. |

These results indicate that:

(1) Normal-paraffins give better yields than iso-paraffins (2) Cyclo-paraffins with 6 carbon atoms in the ring give better yields than those with only 5 carbon atoms in the ring (3) $C_8$ iso-paraffins having 6 carbon atoms in a straight chain can be cyclised to $C_8$ aromatics.

EXAMPLE 5

Further experiments were carried out again using the micro-catalytic reactor technique described above. The feedstock used was a primary flash distillate having the following composition:

|  | Percent wt. |
|---|---|
| Pentanes | 17 |
| Isohexanes | 16 |
| n-hexane | 20 |
| Isoheptanes | 21 |
| n-Heptane | 19 |
| Cyclohexane | 4 |
| Benzene | 1 |
| Toluene | 2 |

The catalyst used was a sodium-promoted platinum-alumina catalyst prepared as described in Example 1 at a pressure of 20 p.s.i.g. The maximum yields of aromatics, which were produced at 575° C. were:

|  | Percent wt. |
|---|---|
| Benzene | 29 |
| Toluene | 15 |

EXAMPLE 6

A light fraction obtained by hydroforming a naphtha fraction over a catalyst of platinum, alumina and combined halogen and having an octane number Research of 76.1 was passed over two platinum-on-alumina catalysts having the following composition:

Catalyst 1:
  Pt=0.739% wt.
  F =0.42% wt.
  Cl=0.34% wt.

Catalyst 2:
  Pt=0.575% wt.
  F =0% wt.
  Cl=0.90% wt.

under the following conditions:

| | |
|---|---|
| Pressure | Atmospheric. |
| Space velocity | 0.2 v./v./hr. |
| Recycle gas | none. |
| Processing period | 5 hours. |
| Temperature | 530° C. |

The results are set out in Table 5.

Table 5

| | Debutanized liquid product | | Exit Gas | | HCT Analysis | | |
|---|---|---|---|---|---|---|---|
| | Yield, percent wt. | Octane No. Research, Clear | Flow Rate, s.c.f./b. | H₂ content, percent vol. | Benzene | Toluene | C₈ aromatics |
| Catalyst 1 | 62 | 90.4 | 1,220 | 62 | -------- | -------- | -------- |
| Catalyst 2 | 43 | >106 | 2,300 | 63 | 27.5 | 54.4 | 10.7 |

It will be seen that the use of the fluorine-free catalysts results in a greater increase in octane number although the yield of debutanised liquid is lower.

EXAMPLE 7

The light platinum reformate fraction of Example 6 was treated over catalyst 2 with and without the addition of 1% wt. sodium as Na₂O, under the following conditions:

| | |
|---|---|
| Pressure | Atmospheric. |
| Space velocity | 0.2 v./v./hr. |
| Recycle gas | None. |
| Processing period | 5 hours. |
| Reaction temperature | 425°, 450°, 475°, 530° C. |

The results obtained are set out in the following Table No. 6.

Table 6

| Catalyst | Reaction temperature, °C. | Debutanized liquid product | | Exit gas | |
|---|---|---|---|---|---|
| | | Yield, percent wt. | Octane Number research, clear | Flow rate, s.c.f./b. | H₂ content, percent vol. |
| No. 2+approx. 1% Na₂O | 425 | 92 | 86.0 | 460 | 80 |
| | 450 | 84 | 91.5 | 850 | 77 |
| | 475 | 79 | 94.7 | 1,130 | 75 |
| | 530 | 61 | 100.0 | 1,890 | 72 |
| No. 2 | 425 | 69 | 94.0 | 850 | 77 |
| | 449 | 65 | 97.1 | 1,130 | 76 |
| | 530 | 43 | >106 | 2,300 | 63 |

It will be seen that a greater yield is obtained wtih the sodium-containing catalyst. For example, at 94 octane number (research clear), the yield is 79% wt. when sodium is added to the catalyst, compared with 69% wt. when no sodium is added.

We claim:
1. A process for the treatment of a feedstock in which at least a major proportion thereof consists of non-aromatic hydrocarbons having at least 5 carbon atoms in a molecule to form aromatics with substantially no deleterious side reactions occurring, comprising contacting the feedstock in a reaction zone in the presence of a catalyst consisting essentially of 0.01 to 5% by weight of platinum, 0.01 to 5% by weight of an alkaline earth metal in combined form, and the balance alumina, and at a temperature of from 400–600° C., tt a pressure not in excess of about 50 p.s.i. ga., and at a space velocity of 0.1 to 1.0 v./v./hr., and in the absence of added hydrogen to the eraction zone, and recovering aromatics therefrom.

2. A process in accordance with claim 1 wherein the catalyst employed therein is halogen free.

References Cited in the file of this patent
UNITED STATES PATENTS

| | | |
|---|---|---|
| 2,386,957 | Ipatieff et al. | Oct. 16, 1945 |
| 2,596,145 | Grote | May 13, 1952 |
| 2,602,772 | Haensel | July 8, 1952 |
| 2,651,598 | Ciapetta | Sept. 8, 1953 |
| 2,773,011 | Haensel | Dec. 4, 1956 |